(12) United States Patent
Takayama

(10) Patent No.: US 11,131,764 B2
(45) Date of Patent: Sep. 28, 2021

(54) RADAR DEVICE

(71) Applicant: DENSO CORPORATION, Kariya (JP)

(72) Inventor: Takuya Takayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/814,098

(22) Filed: Mar. 10, 2020

(65) Prior Publication Data

US 2020/0209380 A1 Jul. 2, 2020

Related U.S. Application Data

(63) Continuation of application No. PCT/JP2018/034256, filed on Sep. 14, 2018.

(30) Foreign Application Priority Data

Sep. 15, 2017 (JP) .............................. JP2017-177539

(51) Int. Cl.
*G01S 13/58* (2006.01)
*G01S 7/35* (2006.01)

(52) U.S. Cl.
CPC ............ *G01S 13/583* (2013.01); *G01S 7/352* (2013.01)

(58) Field of Classification Search
CPC ................................ G01S 13/583; G01S 7/352
See application file for complete search history.

(56) References Cited

U.S. PATENT DOCUMENTS

| | | | |
|---|---|---|---|
| 2002/0130811 A1* | 9/2002 | Voigtlaender | G01S 13/931 342/159 |
| 2009/0079617 A1* | 3/2009 | Shirakawa | G01S 13/87 342/146 |
| 2010/0094508 A1* | 4/2010 | Kozyreff | G01S 13/87 701/45 |
| 2012/0128100 A1 | 5/2012 | Hasegawa | |
| 2013/0259496 A1* | 10/2013 | Kato | G03G 15/0126 399/40 |

(Continued)

FOREIGN PATENT DOCUMENTS

JP      2012-145332 A      8/2012

OTHER PUBLICATIONS

Bliss et al., GMTI MIMO Radar, 2009 International WD&D Conference, 2009, pp. 118-122.

*Primary Examiner* — Marcus E Windrich
(74) *Attorney, Agent, or Firm* — Maschoff Brennan

(57) ABSTRACT

A transmission antenna section includes a plurality of transmission antennas, and a reception antenna section includes one or more reception antennas. A modulation section causes a continuous wave common signal generated by an oscillation section to be branched into the same number as the transmission antennas, and performs phase shift keying using a different phase rotation amount for each of the plurality of branch signals. Thus, the modulation section generates a plurality of transmission signals inputted into the plurality of transmission antennas. A processing section generates, on the basis of a plurality of signal components, information on an object by which a radiation wave from the transmission antenna section has been reflected, the plurality of signal components being extracted from each of one or more reception signals received by the antenna section and corresponding to the plurality of transmission signals.

8 Claims, 13 Drawing Sheets

(56) References Cited

U.S. PATENT DOCUMENTS

| | | | |
|---|---|---|---|
| 2015/0198697 A1* | 7/2015 | Kishigami | G01S 7/411 |
| | | | 342/145 |
| 2016/0154091 A1* | 6/2016 | Yosoku | G01S 7/023 |
| | | | 342/201 |
| 2016/0285172 A1* | 9/2016 | Kishigami | G01S 13/22 |
| 2017/0082730 A1* | 3/2017 | Kishigami | H01Q 21/061 |
| 2017/0212213 A1* | 7/2017 | Kishigami | G01S 13/04 |
| 2017/0214746 A1* | 7/2017 | Zettler | G01S 7/006 |
| 2017/0276769 A1* | 9/2017 | Kishigami | G01S 7/282 |
| 2017/0310507 A1* | 10/2017 | Bordes | G01S 13/00 |
| 2018/0074181 A1* | 3/2018 | Kishigami | G01S 7/288 |

* cited by examiner

FIG.2
REFLECTION COEFFICIENT : D 
PHASE CHANGE IN TRANSMISSION PATH (TX1→OBJECT) : $\alpha_T$
PHASE CHANGE IN RECEPTION PATH (OBJECT→RX1) : $\alpha_R$
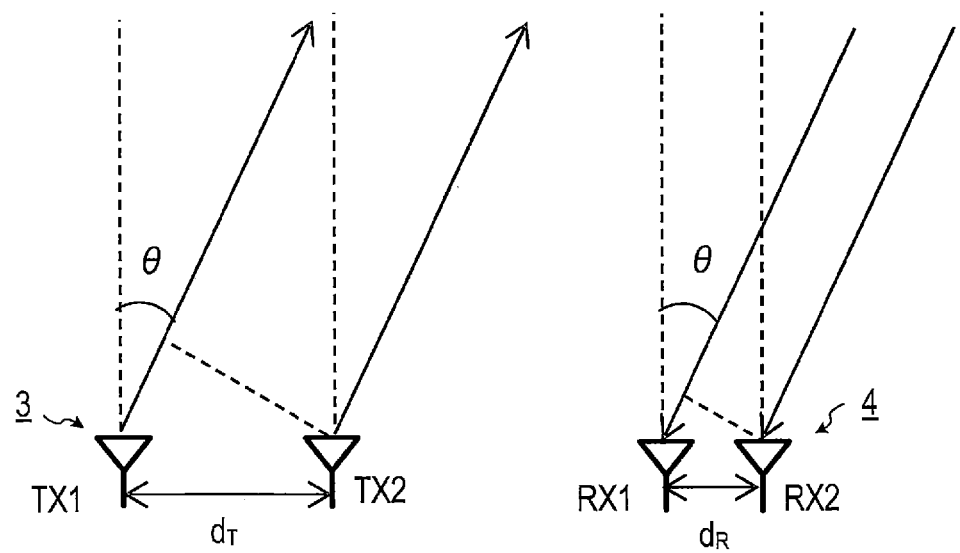

WHEN THE NUMBER OF PHASES P = 4

FIG.12
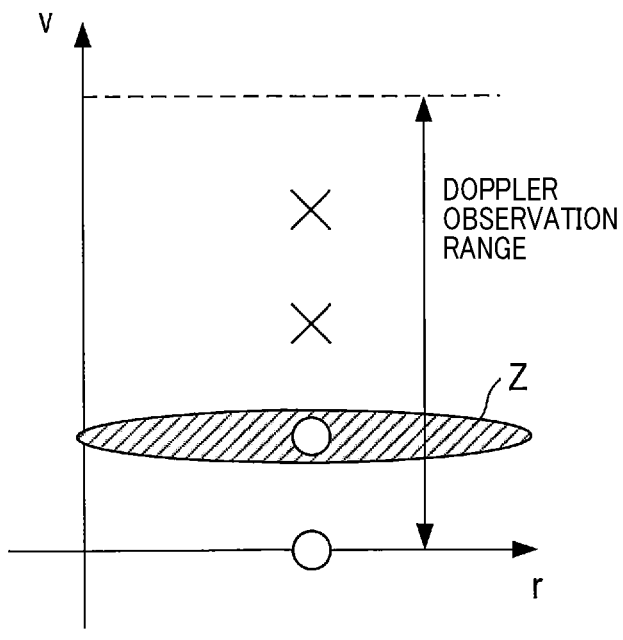
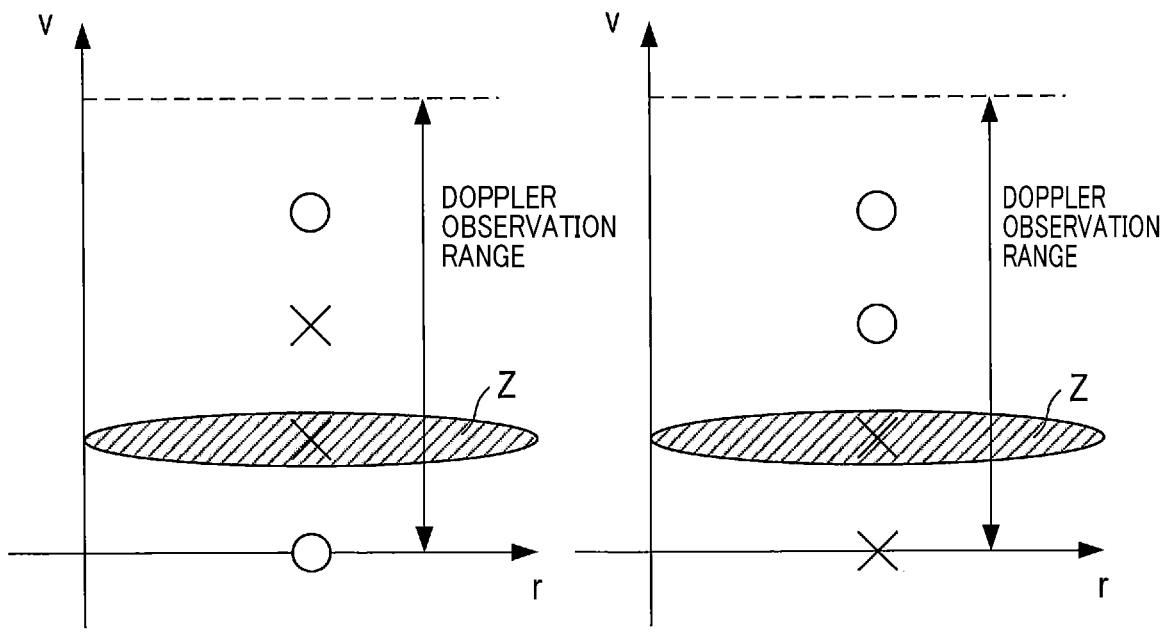

FIG.13
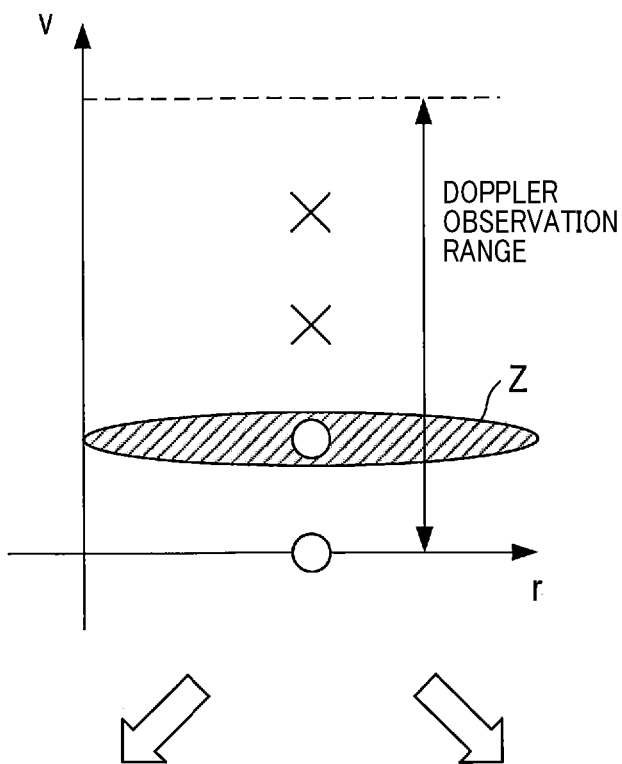
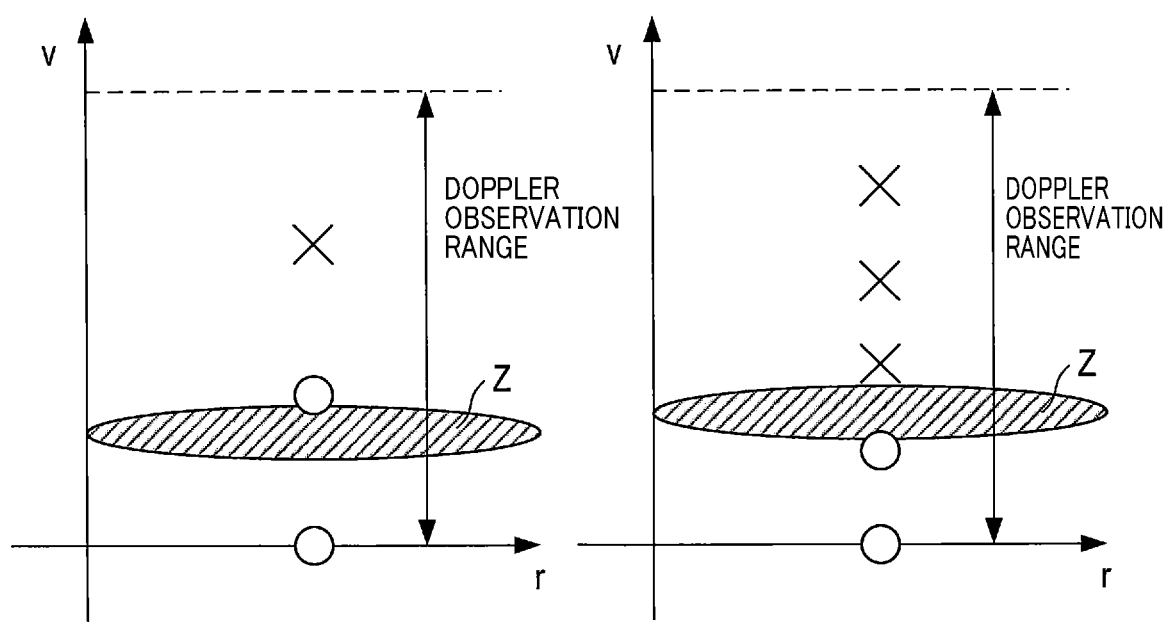

FIG.14
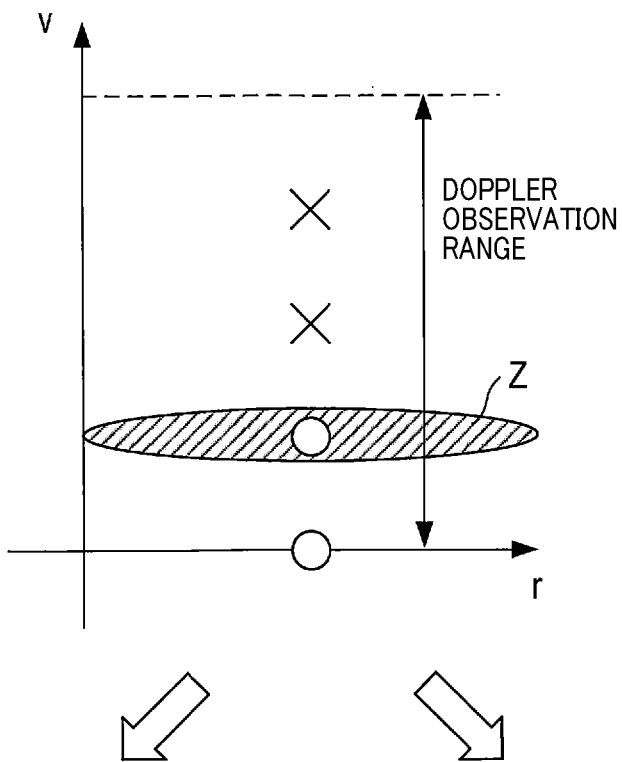
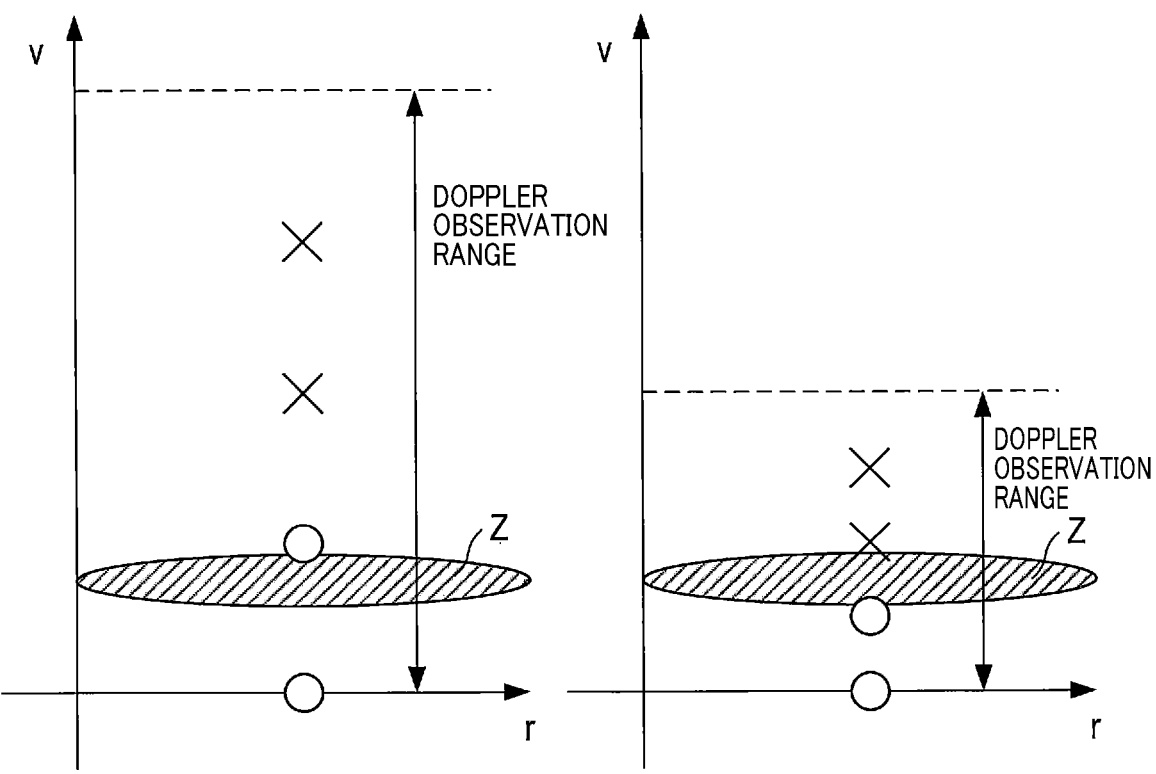

RADAR DEVICE

CROSS-REFERENCE TO RELATED APPLICATION

This application is a U.S. application under 35 U.S.C. 111(a) and 363 that claims the benefit under 35 U.S.C. 120 from International Application No. PCT/JP2018/034256 filed on Sep. 14, 2018, the entire contents of which are incorporated herein by reference. This application also claims the benefit of priority from Japanese Patent Application No. 2017-177539 filed with the Japan Patent Office on Sep. 15, 2017, the entire contents of Japanese Patent Application No. 2017-177539 are incorporated herein by reference.

BACKGROUND

Technical Field

The present disclosure relates to a radar device.

Background Art

A MIMO (Multi Input Multi Output) radar needs to identify individual signals from reception signals in which a plurality of signals simultaneously transmitted from a plurality of transmission antennas are superimposed. As a method for the identification, there has been proposed use of a Doppler division multiple access (hereinafter referred to as DDMA).

SUMMARY

A radar device according to an aspect of the present disclosure includes a transmission antenna section, an oscillation section, a modulation section, a reception antenna section, and a processing section.

The transmission antenna section includes a plurality of transmission antennas. The oscillation section generates a continuous wave common signal. The modulation section generates a plurality of transmission signals inputted into the plurality of transmission antennas by performing phase shift keying using a different phase rotation amount for each of a plurality of branch signals.

In the radar device, P>M, where M represents the number of the transmission antennas of the transmission antenna section and P represents the number of phases used for the phase shift keying.

BRIEF DESCRIPTION OF THE DRAWINGS

FIG. 2 is an explanatory view showing a relationship of transmission antennas and reception antennas with an object.

FIG. 12 is an explanatory view showing an effect obtained by changing a combination pattern of the phase rotation amounts.

FIG. 13 is an explanatory view showing an effect obtained by changing the number of phases.

FIG. 14 is an explanatory view showing an effect obtained by changing a repetition cycle.

DETAILED DESCRIPTION OF THE PREFERRED EMBODIMENTS

Figure 1:
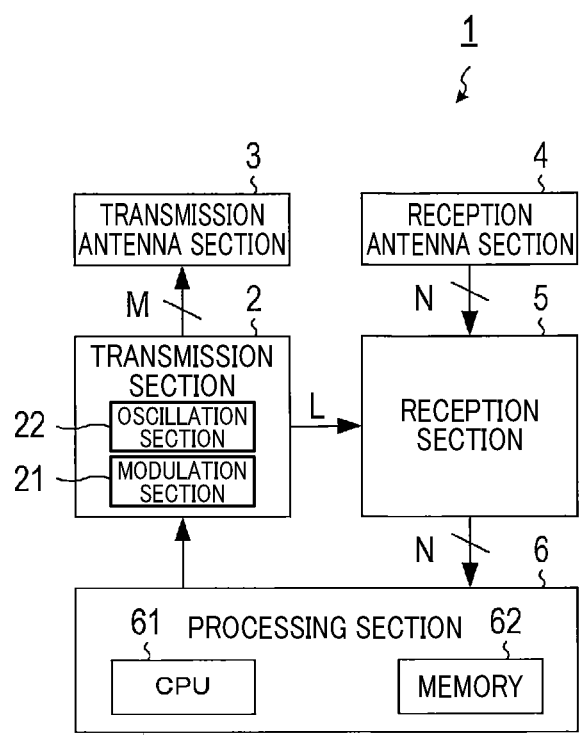
FIG. 1 is a block diagram showing a configuration of a radar device.

The inventor of the present disclosure has studied a technique for improving, in a radar device using Doppler division multiple access, accuracy in identification of a plurality of transmission signals from a reception signal.

As mentioned above, there has been proposed use of Doppler division multiple access (hereinafter referred to as DDMA) in D. W. Bliss, K. W. Forsythe, S. K. Davis, G. S. Fawcett, D. J. Rabideau, L. L. Horowitz, S. Kraut, "GMTI MIMO Radar", 2009 international WD & amp; D Conference, p 118-p 122.

In DDMA, for each preset repetition cycle, the transmission antennas each transmit a continuous wave subjected to phase shift keying in which a phase is rotated by a different phase rotation amount. On a reception side, a reception signal is analyzed. Thus, a phase of the signal is detected for each repetition cycle. Furthermore, a frequency corresponding to a change in phase (i.e., the phase rotation amount) over the plurality of repetition cycles is set as a Doppler frequency, and a Doppler spectrum indicating a component of the Doppler frequency included in the reception signal is calculated. Thus, since the phase rotation amount of the transmission signal is different for each of the transmission antennas, in the Doppler spectrum, the transmission signals from the transmission antennas are extracted as signal components having different Doppler frequencies. The Doppler frequencies are observed in a frequency range (hereinafter referred to as Doppler observation width) determined by a repetition cycle in which a phase of the transmission signal is changed.

As a result of detailed studies by the inventor, however, the following problem has been found in the conventional technique.

Specifically, in the conventional technique, the phase rotation amount used for the phase shift keying is set to M phases which are integral multiples of $\Delta\varphi$, i.e., 0, $\Delta\varphi$, $2\Delta\varphi$, ... $\Delta\varphi$, where M represents the number of transmission antennas and $\Delta\varphi=360°/M$ represents a phase obtained by dividing 1 cycle into M equal parts. Accordingly, in the Doppler spectrum, peaks of the signal components based on the transmission signals from the transmission antennas are arranged at equal intervals in the Doppler observation width. In the conventional technique, therefore, a transmission repetition cycle has needed to be small so that a velocity range of an observation target is smaller than the intervals between the peaks.

When a relative velocity is present between the MIMO radar and an object by which a radiation wave from the MIMO radar is reflected, M peaks in the Doppler spectrum are Doppler-shifted in a frequency direction while a relative positional relationship is maintained. If the shift amount is larger than the intervals between the peaks, frequency aliasing occurs in the Doppler spectrum. When aliasing occurs, it has been impossible to uniquely determine a correspondence relationship indicating which peak is caused by a signal from which transmission antenna.

An aspect of the present disclosure is to provide a technique for improving, in a radar device using Doppler division multiple access, accuracy in identification of a plurality of transmission signals from a reception signal.

A radar device according to an aspect of the present disclosure includes a transmission antenna section, an oscillation section, a modulation section, a reception antenna section, and a processing section.

The transmission antenna section includes a plurality of transmission antennas. The oscillation section generates a continuous wave common signal. The modulation section generates a plurality of transmission signals inputted into the plurality of transmission antennas by performing phase shift keying using a different phase rotation amount for each of a plurality of branch signals, the plurality of branch signals being obtained by causing the common signal to be branched into the same number as the transmission antennas, the phase shift keying being a process in which a phase of the branch signal is rotated for each preset repetition cycle.

The reception antenna section includes one or more reception antennas. The processing section generates, on the basis of a plurality of signal components, information on an object by which a radiation wave from the transmission antenna section has been reflected, the plurality of signal components being extracted from each of one or more reception signals received by the antenna section and corresponding to the plurality of transmission signals.

In the radar device, P>M, where M represents the number of the transmission antennas of the transmission antenna section and P represents the number of phases used for the phase shift keying.

According to such a configuration, a plurality of signal components that are extracted from a reception signal by analyzing the reception signal and are based on transmission signals from the transmission antennas each have a Doppler frequency corresponding to a unique phase rotation amount. Since the number of transmission antennas M is smaller than the number of phases P, by appropriately selecting the phase rotation amount to be used, the signal components based on the transmission signals can be unevenly arranged in the Doppler spectrum. As a result, even when frequency aliasing occurs in the Doppler spectrum, by using, as a clue, a portion in which peaks are unevenly arranged in the Doppler spectrum, it is possible to accurately recognize a correspondence relationship between the plurality of peaks and the plurality of transmission antennas.

An embodiment of the present disclosure will be described with reference to the drawings.

1. Configuration

A radar device 1 shown in FIG. 1 is mounted on a vehicle and used to detect various objects that are present around the vehicle. The radar device 1 is a MIMO radar that transmits and receives radio waves simultaneously by a plurality of antennas.

The radar device 1 includes a transmission section 2, a transmission antenna section 3, a reception antenna section 4, a reception section 5, and a processing section 6.

The transmission antenna section 3 includes M transmission antennas. M is an integer of 2 or more. The transmission antennas are arranged at preset first intervals di in a line in a preset arrangement direction.

The reception antenna section 4 includes N reception antennas. N is an integer of 1 or more. When a plurality of reception antennas are present, the reception antennas are arranged at second intervals $d_R$, which are different from the first intervals $d_T$, in the same direction as the arrangement direction of the transmission antennas.

With reference to FIG. 2, signals received by the reception antennas when M=2 and N=2 will be described. The transmission antennas are expressed as TX1 and TX2, and the reception antennas are expressed as RX1 and RX2.

An object to be detected is assumed to be present in a direction inclined by θ with respect to a front direction of the transmission antenna section 3 and the reception antenna section 4. Furthermore, D represents a reflection coefficient of the object, $a_T$ represents a change in phase of a signal in a path from TX1 to the object, and $a_R$ represents a change in phase of a signal in a path from the object to RX1. The values $a_T$ and $a_R$ are represented by a complex number.

In this case, a signal transmitted from TX1 and received by RX1 is represented by formula (1). A signal transmitted from TX1 and received by RX2 is represented by formula (2). A signal transmitted from TX2 and received by RX1 is represented by formula (3). A signal transmitted from TX2 and received by RX2 is represented by formula (4).

$$a_T \cdot D \cdot a_R \quad (1)$$

$$a_T \cdot D \cdot a_R \cdot \exp(jkd_R \sin\theta) \quad (2)$$

$$a_T \cdot D \cdot a_R \cdot \exp(jkd_T \sin\theta) \quad (3)$$

$$a_T \cdot D \cdot a_R \cdot \exp(jk(d_T+d_R)\sin\theta) \quad (4)$$

Figure 3:
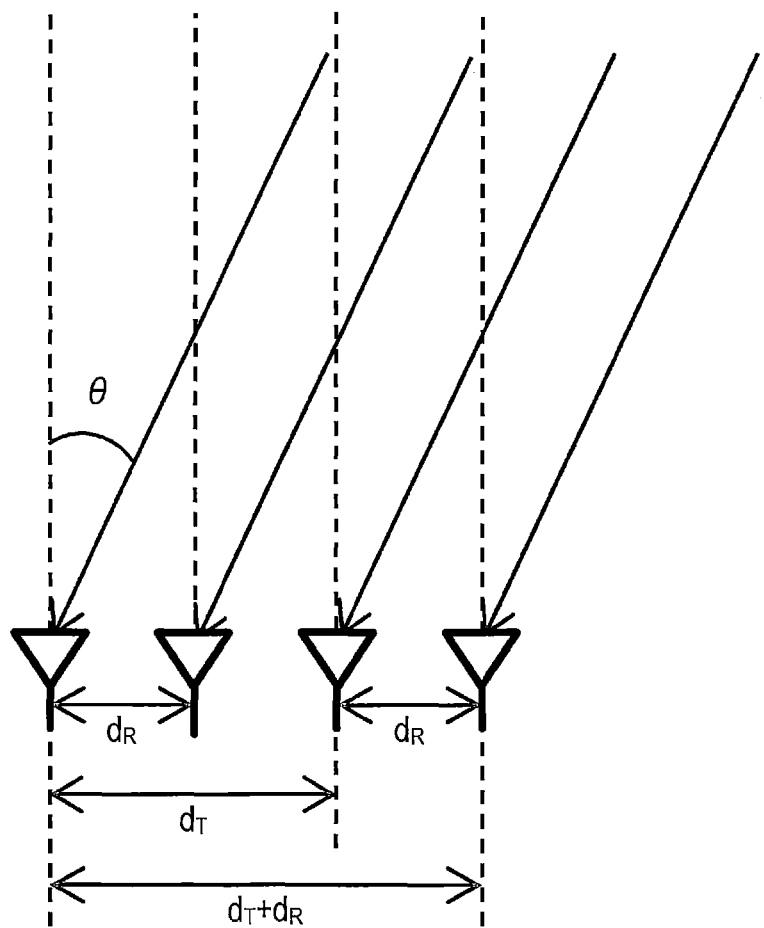
FIG. 3 is an explanatory view showing a relationship of arrangement of the transmission antennas and the reception antennas with arrangement of the reception antennas in a virtual array.

The formulae indicate equivalent cases to cases when, as shown in FIG. 3, four reception antennas are arranged so that three of the reception antennas are located in positions at distances $d_R$, $d_T$, and $d_T+d_R$ from the other reception antenna which is a reference reception antenna. In FIG. 3, the reference reception antenna is located in the leftmost position. Virtual reception antennas arranged in this manner are referred to as a virtual array.

In a MIMO radar, by using the virtual array, angular resolution equivalent to angular resolution when the MIMO radar includes a single transmission antenna and M×N reception antennas is achieved by M+N transmission antennas and reception antennas.

Returning to FIG. 1, the transmission section 2 includes an oscillation section 21 and a modulation section 22.

Figure 4:
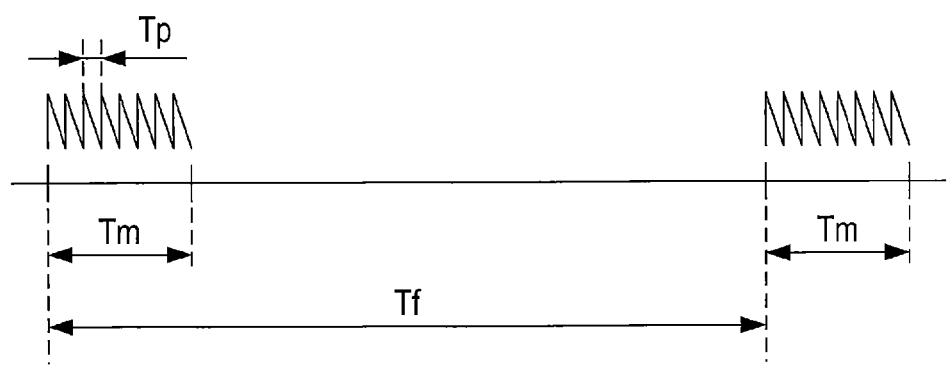
FIG. 4 is an explanatory view showing a function of an oscillation section.

The oscillation section 21 generates a continuous wave common signal. The oscillation section 21 supplies the generated common signal to the modulation section 22, and also supplies the generated common signal as a local signal L to the reception section 5. As shown in FIG. 4, when one frame is set to a measurement cycle Tf (e.g., 50 ms), during a measurement period Tm (e.g., 10 ms) at the top of each frame, the oscillation section 21 repeatedly generates, for each repetition cycle Tp (e.g., 50 μs), a chirp signal whose frequency is continuously changed.

The oscillation section 21 is configured to be capable of appropriately changing the measurement cycle Tf, the measurement period Tm, and the repetition cycle Tp according to instructions from the processing section 6. A frequency width of the chirp signal changed during the repetition cycle is constant for any repetition cycle Tp. Thus, by changing the repetition cycle Tp, a change rate $\Delta f$ of the frequency of the chirp signal is changed.

An allowable range of the repetition cycle Tp and thus an allowable range of the change rate $\Delta f$ of the frequency of the chirp signal are set so that when a beat signal generated by mixing a transmission signal with a reception signal is analyzed, a frequency deviation that occurs according to a relative velocity with respect to the object is negligibly small as compared with a frequency deviation that occurs according to a distance to the object.

The modulation section 22 causes the common signal generated by the oscillation section 21 to be branched, thereby generating the same number M of branch signals as the transmission antennas of the transmission antenna section 3. For each of the M branch signals, the modulation section 22 performs phase shift keying in which a phase of the branch signal is changed for each repetition cycle Tp. Thus, M transmission signals supplied to the respective transmission antennas are generated. In the phase shift keying, a different phase rotation amount $\Delta \varphi$ is set for each of the M branch signals, and a phase of the branch signal is rotated by the phase rotation amount $\Delta \varphi$ for each repetition cycle Tp.

Figure 5:
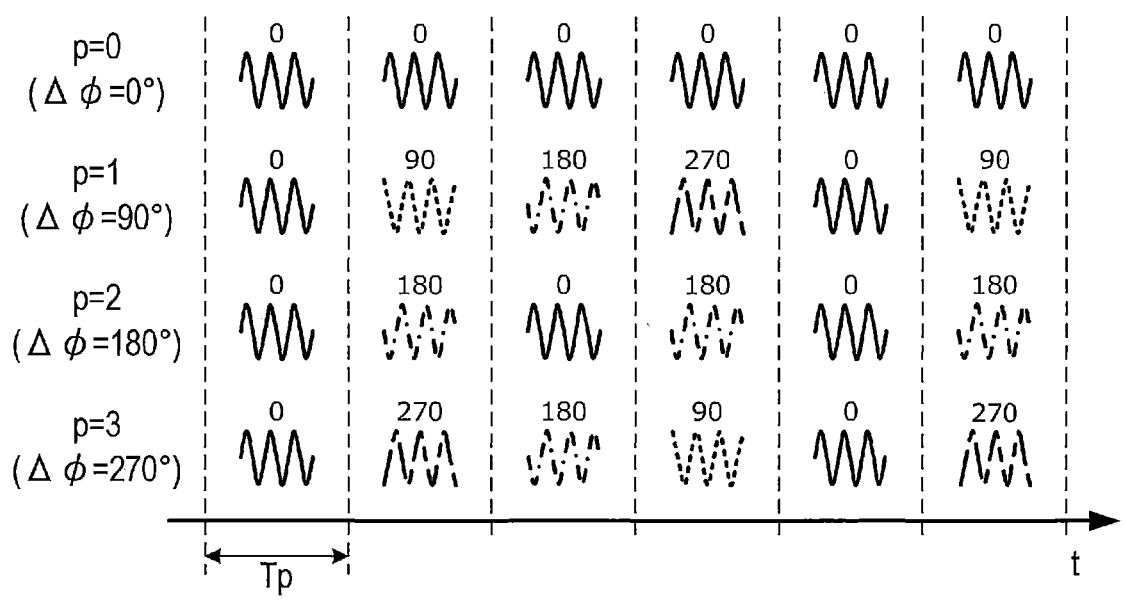
FIG. 5 is an explanatory view showing examples of phase rotation amounts used for phase shift keying performed by a modulation section.

P represents the number of phases used for the phase shift keying. P is an integer greater than M. The modulation section 22 uses P types of phase rotation amounts represented by $\Delta \varphi = p \times 360°/P$, where $p=0, 1, 2, \ldots P-1$. For example, in a case where P=4, as shown in FIG. 5, when $p=0$, $\Delta \varphi=0°$, and a phase difference of the transmission signal which is a signal after the modulation with respect to the branch signal (i.e., common signal) which is a signal before the modulation is 0° in all the repetition cycles Tp. When $p=1$, $\Delta \varphi=90°$, and the phase difference of the transmission signal with respect to the common signal is switched for each repetition cycle Tp and sequentially changed in the order of 0°→90°→480°→270°→0° (continuously changed in this order). When $p=2$, $\Delta \varphi=180°$, and the phase difference of the transmission signal with respect to the common signal is switched for each repetition cycle and sequentially changed in the order of 0°→180°→0°→480°→0° (continuously changed in this order). When $p=3$, $\Delta \varphi=270°$, and the phase difference of the transmission signal with respect to the common signal is switched for each repetition cycle and sequentially changed in the order of 0°→270°→180°→90°→0° (continuously changed in this order).

Since the number of phases P is set so that P>M as described above, for the phase shift keying, not all of the P types of phase rotation amounts $\Delta \varphi$ are used, but some of the P types of phase rotation amounts $\Delta \varphi$ are used.

The modulation section 22 is configured to be capable of appropriately changing setting of the number of phases P, selection of M types of phase rotation amounts used for the phase shift keying from the P types of phase rotation amounts $\Delta \varphi$, and setting of a correspondence relationship between the selected M types of phase rotation amounts and the M transmission antennas. The settings may be changed according to instructions from the processing section 6 or automatically changed. When the settings are automatically changed, the settings may be changed according to a predetermined pattern or randomly changed.

Returning to FIG. 1, for each of N reception signals outputted from the reception antennas of the reception antenna section 4, the reception section 5 generates a beat signal which is a difference signal between the reception signal and the local signal L, and samples the generated beat signal and supplies the sampled signal to the processing section 6.

The processing section 6 includes a microcomputer including a CPU 61, and for example, a semiconductor memory (hereinafter referred to as memory 62) such as a RAM or a ROM. Functions of the processing section 6 are implemented when the CPU 61 executes programs stored in a non-transitory tangible storage medium. In this example, the memory 62 corresponds to the non-transitory tangible storage medium storing the programs. When one of the programs is executed, a method corresponding the program is performed. The processing section 6 may include a single microcomputer or a plurality of microcomputers.

A method of implementing the functions of the processing section 6 is not limited to software, and some or all of the functions may be implemented by one or more pieces of hardware. For example, when the functions are implemented by an electronic circuit which is hardware, the electronic circuit may be implemented by a digital circuit, an analog circuit, or a combination thereof.

2. Process

[2-1. Object Detection Process]

Figure 6:
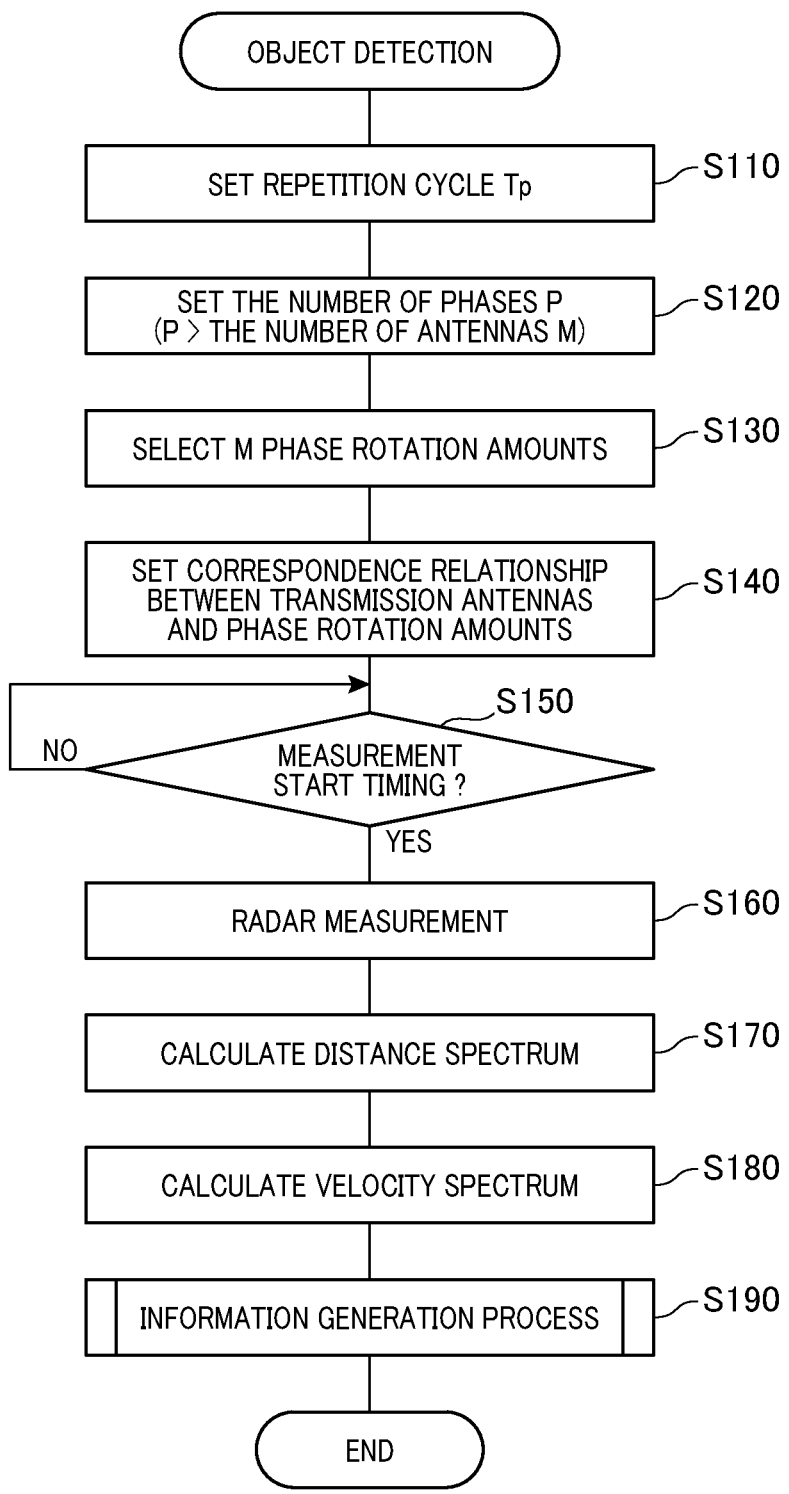
FIG. 6 is a flow chart of an object detection process performed by a processing section.

Next, an object detection process performed by the processing section 6 will be described with reference to a flow chart in FIG. 6.

The process is repeatedly performed when the processing section 6 is started.

First, at S110, the processing section 6 sets the repetition cycle Tp which is a parameter regarding the common signal generated by the oscillation section 21. As described above, when the repetition cycle Tp is changed, the change rate $\Delta f$ of the frequency of the chirp signal is changed. The repetition cycle Tp may be a fixed value, or every time the process is performed, the repetition cycle Tp may be set to be switched according to a predetermined pattern or randomly switched among a plurality of types of values. At this step, the measurement cycle Tf and the measurement period Tm may be set to be variable as appropriate.

At S120, the processing section 6 sets the number of phases P used for the phase shift keying performed by the modulation section 22. The number of phases P is set to a value greater than at least the number of transmission antennas M. For example, the number of phases P may be set so that P=M+1. As with the repetition cycle Tp, the number of phases P may be a fixed value, or every time the process is performed, the number of phases P may be set to be switched according to a predetermined pattern or randomly switched among a plurality of types of values.

At S130, from P types of phase rotation amounts determined by the number of phases P, the processing section 6 selects M types of phase rotation amounts used for the phase shift keying performed by the modulation section 22. The phase rotation amounts are selected so that the rotation amounts are not evenly arranged in 360°, i.e., so that the rotation amounts are unevenly arranged.

Specifically, when P and M have no common divisor, the phase rotation amounts may be arbitrarily selected. When P and M have a common divisor, the phase rotation amounts need to be selected so that the phase rotation amounts are not arranged at intervals in the same repeated pattern.

Figure 7:
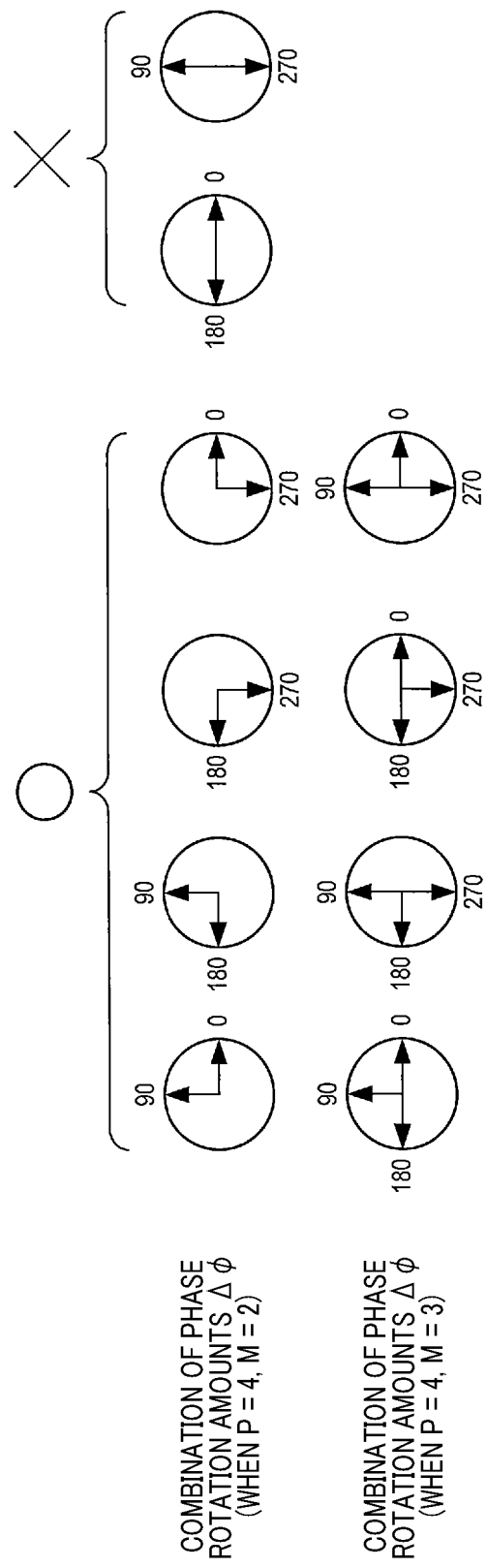
FIG. 7 is an explanatory view showing combination patterns of phase rotation amounts that can be selected and combination patterns of phase rotation amounts that cannot be selected.

For example, as shown in FIG. 7, when P=4 and M=2, as a combination of phase rotation amounts, combinations (0°, 90°), (90°, 180°), (180°, 270°), and (270°, 0°) can be selected, but combinations (0°, 180°) and (90°, 270°) cannot be selected. When P=4 and M=3, as a combination of phase rotation amounts, combinations (0°, 90°, 180°), (90°, 180°, 270°), (180°, 270°, 0°), and (270°, 0°, 90°) all can be selected. In the present embodiment, however, a combination including Δφ=0° is always selected.

The selection of phase rotation amounts may be always constant, or every time the process is performed, the selection of phase rotation amounts may be switched according to a predetermined pattern or randomly switched among selectable combinations.

At S140, the processing section 6 sets a correspondence relationship between the M types of phase rotation amounts selected at S130 and the transmission antennas. The correspondence relationship may be set, for example, according to a preset rule, or randomly set. The setting of the correspondence relationship may be always constant, or every time the process is performed, the setting of the correspondence relationship may be switched according to a predetermined pattern or randomly switched.

Figure 8:
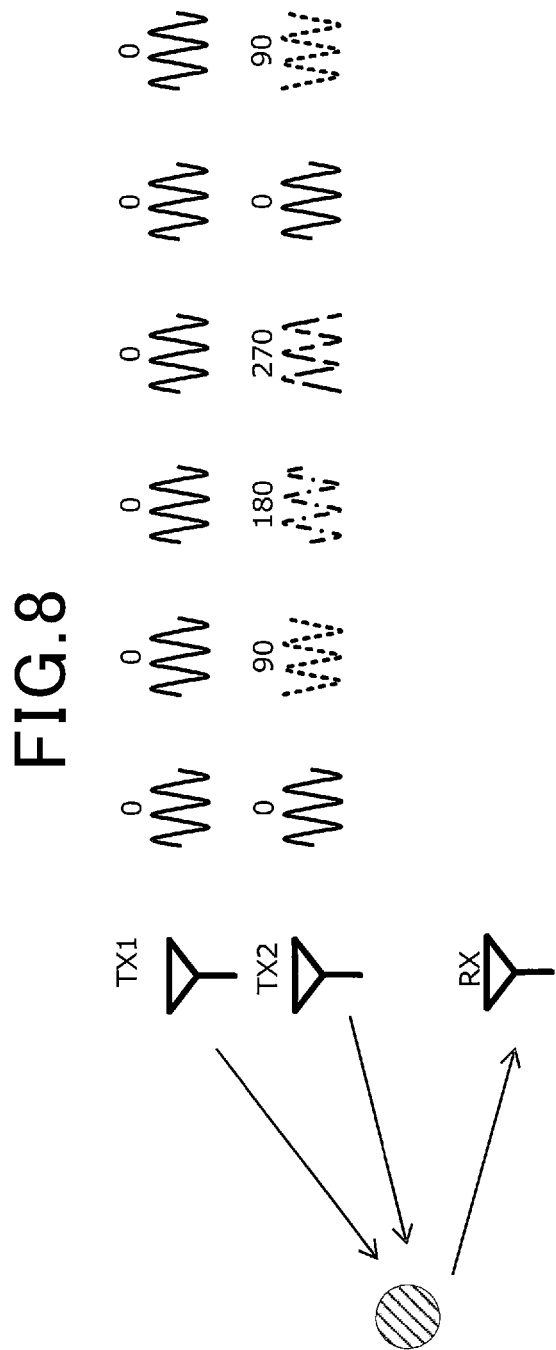
FIG. 8 is an explanatory view showing a selection example of the phase rotation amounts.

FIG. 8 shows a state where when P=4 and M=2, a combination (0°, 90°) is selected as a combination of phase rotation amounts, and Δφ=0° is assigned to TX1 and Δφ=90° is assigned to TX2, phases of transmission signals that have been subjected to the phase shift keying and are supplied to the TX1 and TX2 are changed.

At S150, the processing section 6 determines whether the current time is a measurement start timing. When the processing section 6 determines that the current time is not the measurement start timing, by repeating the process, the processing section 6 waits until the measurement start timing starts. When the processing section 6 determines that the current time is the measurement start timing, control proceeds to S160. The measurement start timing is a timing at which a frame whose length is determined by the measurement cycle Tf is switched.

At S160, according to the setting results obtained at S110 to S140, the processing section 6 causes the transmission section 2 to be operated, and performs radar measurement. Specifically, the processing section 6 causes the transmission section 2 to repeatedly transmit a chirp signal for each repetition cycle Tp during the measurement period Tm, and acquires a sampling result of a beat signal generated from the reception signal. Hereinafter, K represents the number of chirp signals repeatedly transmitted during the measurement period Tm.

At S170, with respect to the sampling results of the beat signals acquired from the N reception antennas, the processing section 6 performs a frequency analysis for each of the reception antennas and for each of the chirp signals, thereby calculating K distance spectra for each of the N reception antennas. In each of the distance spectra, a peak appears in a frequency corresponding to time required for travel between the transmission antenna and an object by which a radiation wave transmitted from the transmission antenna has been reflected (i.e., a distance to the object).

At S180, the processing section 6 calculates a velocity spectrum for each of the reception antennas by using the N×K distance spectra calculated at S170. Specifically, from the K distance spectra regarding a focused reception antenna, the processing section 6 extracts signals having the same frequency bin, and performs a frequency analysis process in a time axis direction with respect to the extracted signals. This process is performed for all the frequencies bin (i.e., distances).

In the velocity spectrum, when a relative velocity is zero between a vehicle (hereinafter simply referred to as vehicle) on which the radar device 1 is mounted and an object (hereinafter simply referred to as object) by which a radiation wave from the transmission antenna section 3 has been reflected, a frequency corresponding to the phase rotation amount assigned to each of the transmission antennas is extracted as a Doppler frequency. Thus, a frequency of a signal component corresponding to Δφ=0° is 0 Hz.

Figure 9:
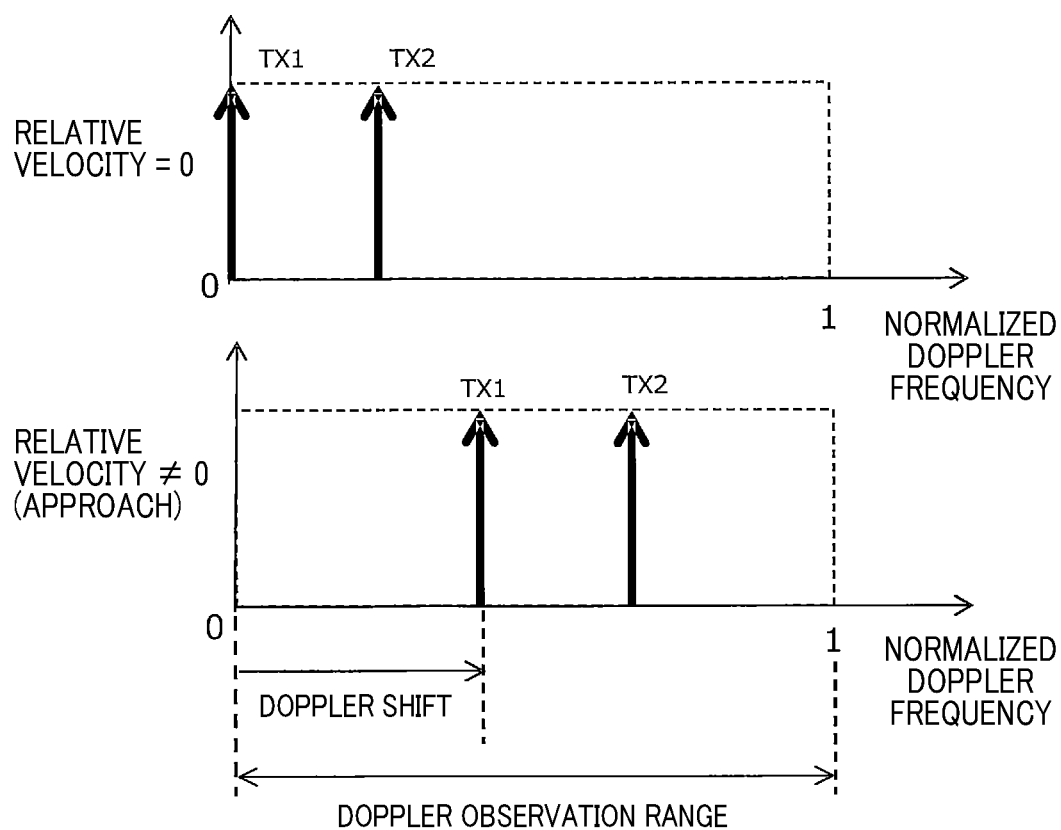
FIG. 9 is an explanatory view showing an example of a same-object peak group that appears in a velocity spectrum.

A range (hereinafter referred to as Doppler observation range) in which the Doppler frequency is observed is determined by the repetition cycle Tp. As shown in FIG. 9, the Doppler frequency is detected at M points among points obtained by dividing the Doppler observation range into P parts. In FIG. 9, an upper limit of the Doppler observation range is normalized to 1.

In the velocity spectrum, when a relative velocity is present between the vehicle and the object, the M Doppler frequencies are shifted by a magnitude corresponding to the relative velocity, and depending on the relative velocity, frequency aliasing occurs.

From the calculation results obtained at S170 and S180, for each of the reception antennas, the processing section 6 generates a two-dimensional spectrum (hereinafter referred to as reception spectrum) indicating a distance and a relative velocity to the object by which the radar wave has been reflected.

At S190, by using the reception spectrum generated for each of the reception antennas, the processing section 6 performs an information generation process of calculating the distance and the relative velocity to the object by which the radar wave has been reflected and an azimuth in which the object is present, and the processing section 6 ends the process.

In the process, S110 corresponds to a cycle setting section, S120 corresponds to a phase number setting section, S140 corresponds to a correspondence setting section, S180 corresponds to a spectrum calculation section, and S190 corresponds to a velocity determination section.

[2-2. Information Generation Process]

Figure 10:
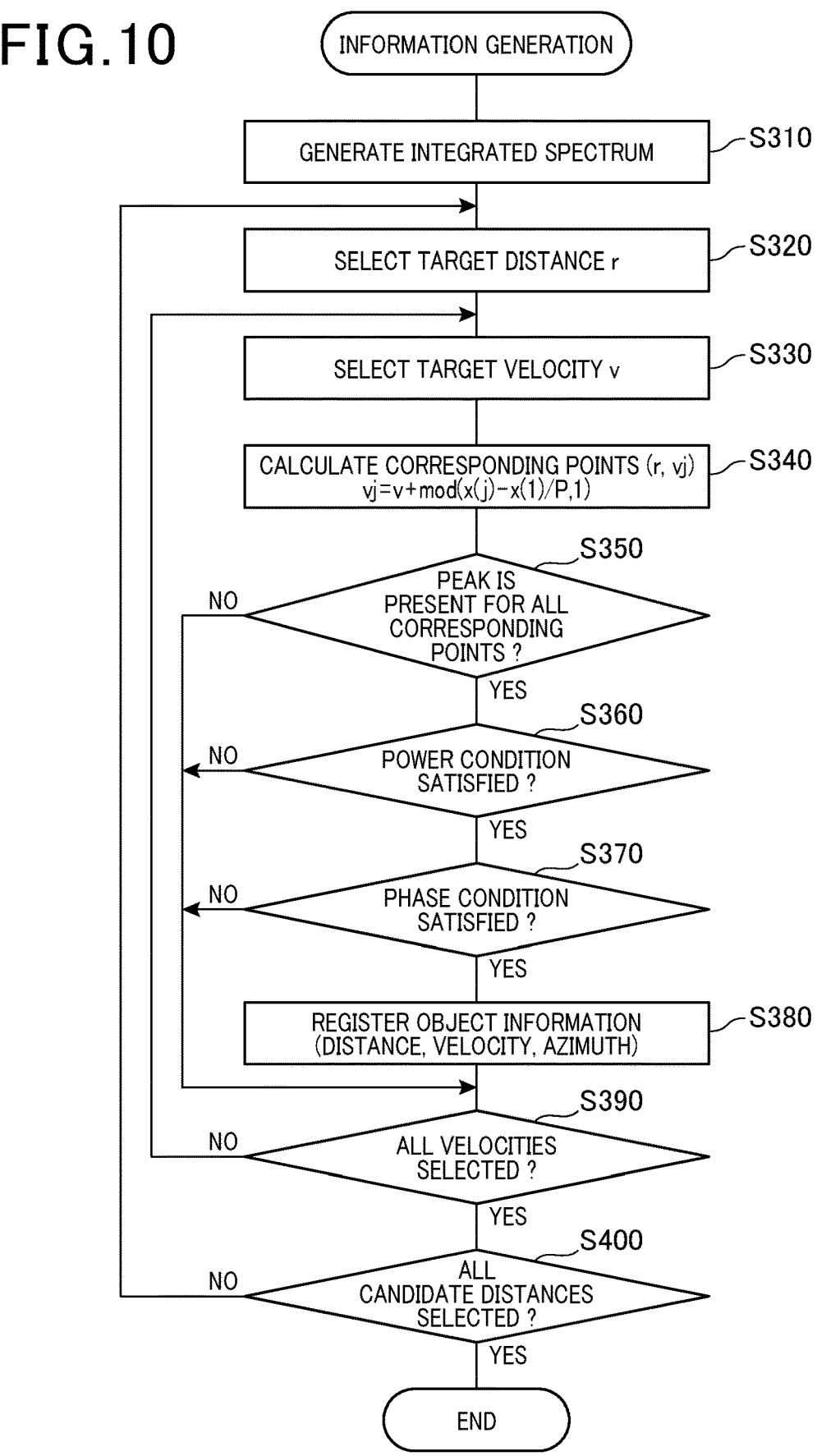
FIG. 10 is a flow chart of an information generation process performed by the processing section.

Details of the information generation process performed by the processing section 6 at S190 mentioned earlier will be described with reference to a flow chart in FIG. 10.

At S310, the processing section 6 performs incoherent integration with respect to the N reception spectra generated for the respective reception antennas at S180, thereby generating a single integrated spectrum g (r, v). The integrated spectrum g (r, v) is calculated by formula (5), where s (r, v, Rch) represents the reception spectrum for each of the reception antennas. Furthermore, r represents a distance, v represents a normalized Doppler velocity when a velocity corresponding to the upper limit frequency of the Doppler observation range is 1, and Rch represents a number identifying the reception antenna.

$$g(r, v) = \sum_{Rch=1}^{N} |(r, v, Rch)|^2 \tag{5}$$

At S320, from candidate distances which are distances at which M or more peaks having an intensity equal to or greater than a preset threshold have been detected in the integrated spectrum, the processing section 6 selects, as a target distance r, a distance that has not yet been selected as a process target at the following steps from S220 to S280.

At S330, from a plurality of peaks detected at the target distance r selected at S320, the processing section 6 selects, as a target velocity v, a velocity corresponding to a peak that has not yet been selected as a process target at the following steps from S340 to S370. In this case, velocities are selected in ascending order.

At S340, the processing section 6 assumes that a peak of the target velocity v is a peak corresponding to the phase rotation amount $\Delta\varphi=0°$, and the processing section 6 calculates, by formula (6), M−1 corresponding points (r, vj) at which a peak corresponding to another phase rotation amount is estimated to be present. In this case, j=2 to M. Furthermore, x (j) represents the phase rotation amount that has been selected at S130 and is other than $\Delta\varphi=0°$. Furthermore, v and vj represent a normalized Doppler frequency and have a value of 0 to 1. Furthermore, mod (a, m) represents the remainder when a is divided by m.

$$v_j = v + \mathrm{mod}(x(j) - x(1)/P, 1) \quad (6)$$

At S350, for all the corresponding points estimated at S340, the processing section 6 determines whether a peak (i.e., secondary maximal point) is present in the integrated spectrum. At S350, when the processing section 6 makes an affirmative determination, control proceeds to S360, and when the processing section 6 makes a negative determination, control proceeds to S390. Hereinafter, M peaks corresponding to the corresponding points are referred to as a candidate peak group.

At S360, the processing section 6 determines whether the candidate peak group satisfies a power condition. At S360, when the processing section 6 makes an affirmative determination, control proceeds to S370, and when the processing section 6 makes a negative determination, control proceeds to S390. In this case, the power condition is a condition that a difference in signal intensity of the peaks belonging to the candidate peak group is in a preset allowable range. This is based on the knowledge that signal intensities of peaks based on a reflected wave from the same object should be similar. At S370, the processing section 6 determines whether the candidate peak group satisfies a phase condition. At S370, when the processing section 6 makes an affirmative determination, control proceeds to S380, and when the processing section 6 makes a negative determination, control proceeds to S390. In this case, the phase condition is a condition that with regard to a phase difference between a reference reception channel and a reception channel other than the reference reception channel, a difference in the phase difference between the candidate peaks is in a preset allowable range. This is based on the knowledge that peaks based on a reflected wave from the same object should arrive from the same direction, and is based on the fact that phase differences between reception channels of the peaks that arrive from the same direction have similar magnitudes.

Hereinafter, the candidate peak group for which an affirmative determination is made at 370 is referred to as a same-object peak group.

At S380, the processing section 6 registers a set of the target distance r and the target velocity v as object information. Furthermore, the processing section 6 also adds, to the object information, an azimuth θ calculated in the following manner. Specifically, peaks corresponding to M same-object peak groups are extracted from each of the N reception spectra calculated for the respective reception antennas. An azimuth detection process such as MUSIC or beam forming is performed considering the extracted M×N peaks as reception signals from the M×N reception antennas included in the virtual array, thereby calculating the azimuth θ of the object. MUSIC is an abbreviation for Multiple signal classification.

The M peaks extracted as the same-object peak group from each of the reception signals obtained from the N reception antennas correspond to M×N reception signals obtained from the virtual array.

At S390, the processing section 6 determines whether all the peaks (i.e., velocities) detected at the target distance r have been selected as the target velocity v. At S390, when the processing section 6 makes an affirmative determination, control proceeds to S400, and when the processing section 6 makes a negative determination, control returns to S330.

At S400, the processing section 6 determines whether all the candidate distances have been selected as the target distance r. At S400, when the processing section 6 makes an affirmative determination, the processing section 6 ends the process, and when the processing section 6 makes a negative determination, control returns to S320.

3. Effects

The embodiment described above in detail exhibits the following effects.

(3a) In the radar device 1, the number of phases P used when the phase shift keying is performed with respect to the transmission signals supplied to the M transmission antennas is set so that P>M, and furthermore, the phase rotation amounts used for the phase shift keying for the transmission signals are selected so that peaks corresponding to the transmission signals detected in the velocity spectrum are unevenly arranged. Even when frequency aliasing occurs in the velocity spectrum, therefore, by using the arrangement of the peaks as a clue, it is possible to accurately recognize a correspondence relationship between the peaks and the transmission antennas.

Figure 11:
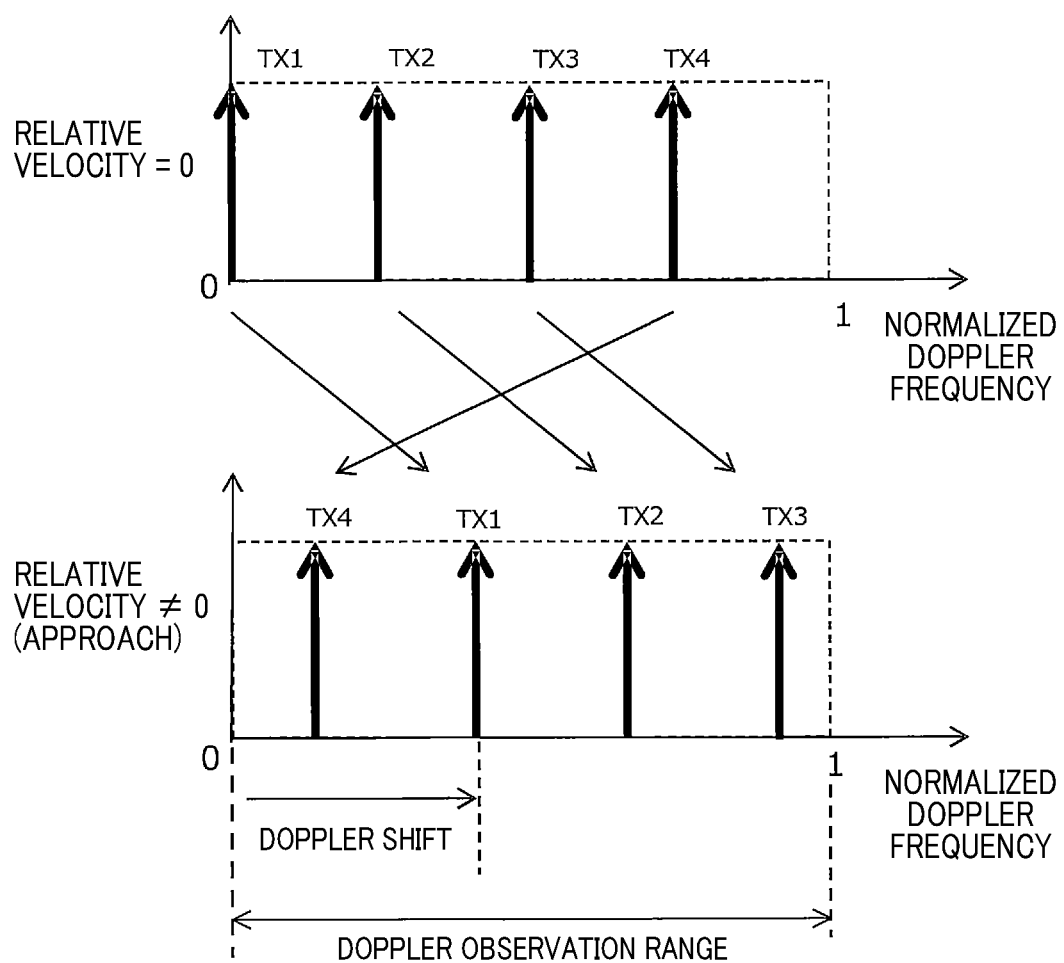
FIG. 11 is an explanatory view showing an example in which a correspondence relationship between a same-object peak group and a plurality of transmission antennas is unknown.

Specifically, as shown in FIG. 11, when the number of phases P is set so that P=M, peaks (i.e., a same-object peak group) corresponding to the transmission signals detected in the velocity spectrum are evenly arranged in the Doppler observation range. An upper part of FIG. 11 indicates a state where a relative velocity with respect to the object is zero, and a lower part of FIG. 11 indicates a state where a relative velocity is present and peaks are shifted. In the velocity spectrum shown in the lower part, all the peaks appear at even intervals, and this makes it impossible to accurately identify which peak corresponds to which transmission antenna.

FIG. 9 shows the case where P=4 and P=2 and the phase rotation amounts when p=0 and p=1 are used. Two peaks belonging to the same-object peak group are located at uneven intervals in the Doppler observation range. Even when a Doppler shift due to the relative velocity occurs, therefore, a relationship between the peaks and the transmission antennas can be identified from the uneven positional relationship.

(3b) The radar device 1 is configured to be capable of changing, for each frame, the selections of the repetition cycle Tp, the number of phases P, and the phase rotation amount that affect the determination of a position at which the same-object peak group is generated in the velocity spectrum. This makes it possible to prevent the peaks of the same-object peak group from being buried in unnecessary peaks generated on the basis of various stationary objects such as a road surface and a roadside object.

Specifically, as shown in FIG. 12, when a noise region Z indicates a region in which peaks of a stationary object are generated in the reception spectrum, one of same-object peak groups may be buried in the noise region Z. Circles in FIG. 12 indicate points corresponding to selected phase rotation amounts, i.e., peaks belonging to the same-object peak group, and crosses in FIG. 12 indicate points corresponding to unselected phase rotation amounts. The same applies to FIGS. 13 and 14. As shown in FIG. 12, depending on the selection of phase rotation amounts used for the phase shift keying, it is possible to prevent the peaks belonging to the same-object peak group from being buried in the noise region Z.

As shown in FIG. 13, when the number of phases P used for the phase shift keying is changed, the phase rotation amounts that can be selected in the phase shift keying, i.e., positions in the reception spectrum at which peaks appear are changed. Also by changing the setting of the number of phases P, therefore, the same effect can be achieved as when the selection of phase rotation amounts is changed.

Furthermore, as shown in FIG. 14, when the repetition cycle Tp is changed, the Doppler observation range is increased or decreased, and thus even when the number of phases P and the selected phase rotation amounts are the same, positions in the reception spectrum at which peaks belonging to the same-object peak group appear are changed. Also, by changing the setting of the repetition cycle Tp, therefore, the same effect can be achieved as when the selection of phase rotation amounts is changed and when the setting of the number of phases P is changed.

4. Other Embodiments

The embodiment of the present disclosure has been described, but the present disclosure is not limited to the above embodiment and may be modified in various manners.

(4a) In the above embodiment, regardless of an external situation, the change is made in the parameters (i.e., the selections of the repetition cycle Tp, the number of phases P, and the phase rotation amount) that change the position at which the same-object peak group is generated, but the present disclosure is not limited to this. For example, the parameters may be changed according to the own vehicle velocity or a relative velocity with respect to an object that the vehicle is tracking.

(4b) In the above embodiment, $\Delta\varphi=0°$ is always selected as the phase rotation amount used for the phase shift keying, but the present disclosure is not limited to this. When $\Delta\varphi=0°$ is not selected, in order to register the object information, the velocity v can be estimated from information on the same-object peak group.

(4c) In the above embodiment, the power condition and the phase condition are used to determine whether a candidate peak group is the same-object peak group. However, the power condition and the phase condition may be omitted, or another condition may be added.

(4d) In the above embodiment, the object information is registered when all the M peaks belonging to the same-object peak group are detected, but the present disclosure is not limited to this. For example, in a case where M is 4 or more, the object information may be registered when 3 or more peaks belonging to the same-object peak group are detected.

(4e) In the above embodiment, a plurality of functions of a single component may be implemented by a plurality of components, or a single function of a single component may be implemented by a plurality of components. Furthermore, a plurality of functions of a plurality of components may be implemented by a single component, or a single function implemented by a plurality of components may be implemented by a single component. Furthermore, a part of the configuration of the embodiment may be omitted. Furthermore, at least a part of the configuration of the embodiment may be added to or substituted by another part of the configuration of the embodiment.

(3f) Other than the radar device described above, the present disclosure may also be implemented in various forms such as a system including the radar device as a component.

What is claimed is:

1. A radar device comprising:
a transmission antenna section including a plurality of transmission antennas;
an oscillation section configured to generate a continuous wave common signal;
a modulation section configured to generate a plurality of transmission signals inputted into the plurality of transmission antennas by performing phase shift keying using a different phase rotation amount for each of a plurality of branch signals, the plurality of branch signals being obtained by causing the common signal to be branched into the same number as the transmission antennas, the phase shift keying being a process in which a phase of the branch signal is rotated for each preset repetition cycle;
a reception antenna section including one or more reception antennas; and
a processing section configured to generate, on the basis of a plurality of signal components, information on an object by which a radiation wave from the transmission antenna section has been reflected, the plurality of signal components being extracted from each of one or more reception signals received by the reception antenna section and corresponding to the plurality of transmission signals, wherein
P>M, where M represents the number of the transmission antennas of the transmission antenna section and P represents the number of phases used for the phase shift keying.

2. The radar device according to claim 1, wherein:
the processing section is further configured to:
calculate, by analyzing the one or more reception signals, a velocity spectrum in which a velocity at which a phase of the one or more reception signals is changed for each of the repetition cycles is associated with a frequency, and
extract, as a same-object peak group, the same number of peaks as the transmission antennas that are generated in the velocity spectrum due to the same object and to determine a relative velocity of the object from a positional relationship in the velocity spectrum between the plurality of peaks belonging to the same-object peak group; and
the modulation section is configured for the phase rotation amount to be set for each of the plurality of branch signals, thereby the plurality of peaks belonging to the same-object peak group are arranged at uneven intervals.

3. The radar device according to claim 2, wherein the processing section is configured to use, as a condition for extracting the same-object peak group, a condition that a power difference between the plurality of peaks belonging to the same-object peak group is in a preset allowable range.

4. The radar device according to claim 2, wherein:
the reception antenna section includes a plurality of reception antennas;
the processing section is configured to calculate a velocity spectrum for each of the plurality of reception antennas; and
the processing section is configured to use, as a condition for extracting the same-object peak group, a condition that a phase difference between the plurality of peaks that are extracted in each of the plurality of reception antennas and are candidates for the same-object peak group is the same among the plurality of antennas.

5. The radar device according to claim 1, wherein the processing section is further configured to periodically change the number of phases used for the phase shift keying performed by the modulation section.

6. The radar device according to claim 1, wherein the processing section is further configured to periodically change a correspondence relationship between the plurality of transmission antennas and the phase rotation amounts.

7. The radar device according to claim 1, wherein the processing section is further configured to periodically change the repetition cycle.

8. The radar device according to claim 1, wherein the oscillation section is configured to generate, as the common signal, a chirp signal whose frequency is continuously changed.

* * * * *